3,240,822
REDUCTIVE COUPLING PROCESS
Robert Arnold Braun, Newark, Del., assignor to E. I. du Pont de Nemours and Company, Wilmington, Del., a corporation of Delaware
No Drawing. Filed Aug. 10, 1964, Ser. No. 388,660
1 Claim. (Cl. 260—635)

This is a continuation-in-part of my copending application Serial No. 41,779, filed July 11, 1960, now abandoned.

This invention relates to a process and more particularly to a process for making diolefinic ethylene glycols.

Diolefinic ethylene glycols have attracted particular interest in recent years because they are versatile polymerizable compounds which can be prepared from readily available raw materials. Because such diolefinic glycols have a plurality of sites for polymerization they are useful, for example, for condensation with polybasic acids to make polyesters, reaction with isocyanates to make polyurethanes, addition polymerization with ethylenically unsaturated materials or combinations thereof. Also, because of their high functionality, they are useful as intermediates in the preparation of a wide variety of other chemical compounds.

Heretofore, diolefinic ethylene glycols have been prepared by the coupling of alpha,beta-unsaturated carbonyl compounds, that is, alpha,beta-unsaturated aldehydes and ketones in an aqueous acidic medium. However, this conventional process has been subject to several disadvantages. First, even with the most reactive alpha,beta-unsaturated carbonyl compounds, the aforementioned known process has resulted in comparatively low yields. In addition, significant quantities of high-oiling residues are obtained. Also, with this known proces, recovery of the desired reaction product is comparatively difficult and time consuming and requires, among other things, multiple extraction of the aqueous reaction medium. Furthermore, the aforementioned known reaction often presents a foaming problem caused by the evolution of hydrogen in the reductive coupling reaction.

This invention provides an improved process by which high yields of diolefinic ethylene glycols can be obtained with marked simplification of purification procedures, without foaming and with a reduction and sometimes eliminaion of high-boiling residues. More specifically, the subject invention provides an improvement in the process for making diolefinic ethylene glycols by the reductive coupling of alpha,beta-unsaturated carbonyl compounds which improvement comprises carrying out said reaction under anhydrous conditions with a zinc-copper couple and an acid having dissociation constant of greater than about $1 \times 10^{-5}$ in the presence of inert polar organic solvent having a boiling point at atmospheric pressure of less than about 170° C. The terms "diolefinic ethylene glycol" as used herein refers to compounds having the structural formula

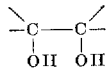

wherein at least one of the unsatisfied valances on each carbon-atom is bonded to a radical containing non-benzenoid unsaturation; the terms include cycloolefinic.

Any of a wide variety of alpha,beta-unsaturated carbonyl compounds, that is, alpha,beta-unsaturated aldehydes and ketones, can be coupled in accordance with this invention. Examples of such carbonyl compounds are acrolein, methacrylein, alpha-ethylacrolein, alpha-isopropylacrolein, alpha-butylacrolein, alpha-phenylacrolein, alpha-(p-tolyl)acrolein, beta-vinylacrolein, beta-ethylacrolein, crotonaldehyde, cinnamaldehyde, 2,4-hexadienal, beta-methylcrotonaldehyde, 2-methyl-2-butenal, 2-hexenal, 2-heptenal, 2-octenal, 2-nonenal, 2-ethyl-2-hexenal, octatrienal, methyl vinyl ketone, isophorone, phorone, chalcone, 2,4-dimethyl seneciophenone, methyl-2-butenone, ethyl-2-hexenone, hexyl octatrienone and mixtures thereof. The preferred carbonyls used in the process of this invention have the formula:

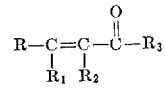

wherein R and $R_1$ are selected from the class consisting of hydrogen, alkyl, aryl and alkenyl radicals and $R_2$ and $R_3$ are selected from the class consisting of hydrogen and alkyl radicals. Preferably, R, $R_1$, $R_2$ and $R_3$ each contain less than about 8 carbon atoms. Aldehydes, that is, carbonyl compounds in which $R_3$ is hydrogen, and especially acrolein, are particularly preferred.

Illustrative products of this invention derived by coupling the aforementioned aldehydes by the process of this invention are the divinyl ethylene glycol, diisopropenyl ethylene glycol, di(alpha-isopropylvinyl)ethylene glycol, dipropenyl ethylene glycol, 1,2-divinyl-1,2-dimethyl ethylene glycol, distyryl ethylene glycol, dipentenyl ethylene glycol, di(hepta-1,3,5-trienyl)ethylene glycol, dihexenyl ethylene glycol, diheptenyl ethylene glycol, 1,2-diphenyl-1,2-distyryl ethylene glycol, di(2-methyl propen-1-yl)ethylene glycol, vinyl isopropenyl ethylene glycol, bis(1-hydroxy-3,5,5-trimethylcyclohex-2-ene) and the like.

The zinc-copper couple used in the process of this invention comprises metallic zinc on which is deposited metallic copper. Usually, the couple contains about from 0.1 to 10% of copper. The couple can be prepared in the conventional manner. A preferred procedure for preparing the couple is to react a cold aqueous solution of a cupric salt with powdered zinc, for example, by adding an aqueous solution of a copper sulfate to a cold aqueous dispersion of zinc dust. Another method for preparing the couple is, for example, by reduction of cupric oxide on finely divided zinc with hydrogen at elevated temperature. Copper-zinc alloys can also be used.

The acid used in the improved process of this invention has a dissociation constant in water of greater than about $1 \times 10^{-5}$. Examples of such acids are the strong mineral acids such as hydrochloric acid, sulfuric acid, phosphoric acid, hydrobromic acid and organic acids such as para-toluene sulfonic acid, oxalic acid, formic acid, acetic acid, propionic acid, butyric acid and the like. The 1 to 4 carbon atom saturated aliphatic monocarboxylic acids, and particularly acetic acid are preferred.

The anhydrous solvent medium in which the reaction of this invention is carried out comprises a polar organic solvent which does not react with the carbonyl compounds, the acid or the zinc-copper couple used therein. This solvent should boil below about 170° C. and preferably at about from 40 to 100° C. Illustrative solvents falling within this group are dioxane, diglyme, methylal, diethoxymethane, diethoxyethane, dibutoxyethane, diisopropyl ether, methyl n-butyl ether, diisobutyl ether, methyl isoamyl ether, ethyl t-butyl ether, dimethyl acetamide, dimethyl sulfoxide, dimethyl formamide, acetonitrile, tetrahydrofuran or mixtures thereof. Ether solvents including both the cyclic ethers such as tetrahydrofuran and the aliphatic ethers such as methylal, diethoxyethane and diisopropyl ether are preferred. Since the reduction potentials of couples of the type used in this invention are generally less in organic media than in aqueous media, it is particularly surprising that the inert polar organic media used in the improved process of this invention leads to a rapid reaction and high yields as compared with known aqueous processes.

Generally, it is preferred to charge the couple, solvent and carbonyl compound to a reaction vessel, then slowly add the acid thereto. The reaction is usually carried out at a temperature of —40 to 70° C., and preferably —20 to 30° C. Usually, since the reaction is strongly exothermic, the reaction is held at a temperature of about from —20 to +10° C. during the addition of the acid. Although, if the acid is added slowly, the reaction proceeds at substantially the same rate as acid is added, preferably, the reaction mixture is slowly warmed to a temperature of about from 10 to 30° C. for about from 1 to 20 hours after all of the acid has been added. Although the proportions of reactants can be varied widely, in order to obtain maximum yields preferably about from 1 to 2 equivalents of zinc-copper couple and about from 1 to 1.5 equivalents of acid are used for each equivalent of carbonyl compound. Enough solvent is used to permit dispersion of the zinc-copper couple and the zinc salt by-product. Usually, about from 100 to 1000 and preferably 200 to 400 parts by weight of solvent are used per mole of carbonyl reactant.

After the reaction has run to completion, the zinc salt of the particular acid used and the unreacted couple are filtered therefrom, then the solvent is removed from the reaction vessel, for example, by flash distillation at reduced pressure. With some products, for example, divinyl ethylene glycol, the resulting crude product is of sufficient purity that it can be used for most purposes directly. With other products, it is desirable to further purify the crude product by conventional procedures, for example, by fractional distillation or crystallization, depending upon whether the final product is solid or liquid. If strong mineral acids are used in the coupling reaction, preferably a base such as sodium carbonate or the like is added to the reaction mixture before the solvent is distilled therefrom and the product purified.

The process of this invention provides markedly improved yields of diolefinic ethylene glycols as compared with conventional processes for making such compounds. Filtration of the reaction mixture coupled with stripping of the solvent therein yields a product of a remarkably high purity which for some products and purposes need not be further purified. Further purification can be easily carried out by conventional procedures, for example, fractional distillation or crystallization, if necessary. Thus, the process of this invention greatly simplifies recovery of the diolefinic ethylene glycol product as compared with known procedures. In addition, the process of this invention is free from foaming, a problem of often presented by conventional aqueous reductive coupling reactions.

The products obtained by the process of this invention have wide versatility in the preparation of polymers for fibers, films, foils and coating compositions. Such polymers can be prepared by polymerization by conventional procedures of the products obtained by the process of this invention, either alone or in combination with, for example, polybasic acids, polyisocyanates or ethylenically unsaturated polymerizable materials. The products of this invention are also useful as versatile synthesis intermediates in the preparation of a wide variety of compounds, other than polymeric materials, for example, dinitriles by reaction with hydrogen cyanide and diesters by the reaction with monocarboxylic acids.

In the following examples, which are intended to illustrate this invention, parts and percentages are by weight unless otherwise indicated.

*Example 1*

A zinc-copper couple is prepared by adding an aqueous solution containing 20 parts of $CuSO_4 \cdot 5H_2O$ to 200 parts (3.1 moles) of zinc dust dispersed in 300 parts of crushed ice and 300 parts of cold water. The mixture is stirred rapidly for 30 minutes, then the couple is filtered and washed with two 100-part portions of water and two 100-part portions of tetrahydrofuran. The resulting black powdered couple is then charged to a reaction vessel together with about 1000 parts of tetrahydrofuran. The reaction vessel is cooled to about 0° C., then 168 parts of acrolein (3.0 moles) is added thereto. 192 parts of glacial acetic acid (3.2 moles) is slowly added to the reaction mixture over a period of about 3 hours while the reaction temperature is held at about 0 to 10° C. After all the acetic acid has been added, the reaction mixture is allowed to warm slowly and stirred at about room temperature for 17 hours.

The reaction mixture is cooled to —20° C. and filtered to remove the unreacted couple and zinc acetate. The tetrahydrofuran solvent is then stripped from the filtrate to give a 96% yield of viscous, pale-yellow divinyl ethylene glycol, based on acrolein. This product is further fractionally distilled to yield 141 parts (about 83% yield based on acrolein) of high purity divinyl ethylene glycol boiling at a temperature of 88° C. at a pressure of 6.5 millimeters of mercury absolute and having an index of refraction 25° C. of 1.4738. Analysis of the product shows 63.75% carbon and 9.13% hydrogen as compared with theoretical values of 63.14% and 8.83%, respectively.

If the procedure described above is repeated except that water is substituted for the tetrahydrofuran and the product is recovered from the aqueous reaction medium by extraction with an organic solvent and fractional distillation under reduced pressure, yields on the order of 20 to 50% based on acrolein are obtained.

A lacquer can be prepared by first polymerizing 5 parts of the divinyl ethylene glycol described above with 95 parts of methyl methacrylate in a toluene-acetone solvent mixture containing a small portion of benzoyl peroxide at about 60° C. for about 5 hours. The resulting polymer solution can be used directly as a clear lacquer or pigmented and modified in the conventional manner.

*Example 2*

A zinc-copper couple is prepared from 40 parts of $CuSO_4 \cdot 5H_2O$ and 400 parts (6.1 moles) of zinc dust as described in the preceding example. The resulting couple is charged to a reaction vessel together with about 2000 parts of tetrahydrofuran and about 430 parts (6 moles) of crotonaldehyde. The reaction vessel is cooled to about 0 to 5° C., then 384 parts (6.4 moles) of glacial acetic acid is slowly added thereto over a period of about two hours. The reaction mixture is allowed to warm gradually and then stirred at room temperature for about 17 hours. The resulting reaction mixture is filtered to remove the zinc acetate and unreacted zinc-copper couple, then tetrahydrofuran is stripped therefrom by distillation under reduced pressure. The yield of product is 89% based on the weight of crotonaldehyde. The product, dipropenyl ethylene glycol, is essentially pure and boils at about 77° C. at a pressure of about 1.9 millimeters of mercury absolute. The product has a refractive index at 25° C. of 1.4756.

*Example 3*

A zinc-copper couple is prepared from 400 parts (6.1 moles) of zinc dust and 40 parts of $CuSO_4 \cdot 5H_2O$ as described in the preceding examples. The resulting couple is charged to a reaction vessel together with about 2000 parts of tetrahydrofuran and 421 parts (6.0 moles) of methacrolein. The reaction vessel is cooled to 0° C., then 384 parts (6.4 moles) of glacial acetic acid are added thereto over a period of 3 hours. The resulting reaction mixture is filtered, then the tetrahydrofuran is distilled therefrom under reduced pressure. The resulting product boils at about 71° C. at a pressure of 0.75 millimeters of mercury absolute and has a refractive index at 25° C. of 1.4761. The product is redistilled under reduced pressure to yield 247 parts of diisopropenyl ethylene glycol (64.5% yield based on methacrolein). Analysis of the product shows 67.18% carbon, 9.85% hydrogen and 23.17% hydroxyl as compared with theoretical values of 67.57% carbon, 9.92% hydrogen and 23.92% hydroxyl.

Substantially similar results are obtained if 575 parts of 2,4-hexadienal are substituted for the methacrolein used above to yield di(penta-1,3-dienyl)ethylene glycol.

Example 4

A zinc-copper couple is prepared from 3.3 parts of $CuSO_4 \cdot 5H_2O$ and 33.3 parts (0.51 mole) of zinc dust as described in the preceding examples. The resulting couple is charged to a reaction vessel along with 175 parts of tetrahydrofuran and 66 parts (0.5 mole) of cinnamaldehyde. Next, the reaction mixture is cooled to a temperature of 0 to —5° C. with a Dry Ice-acetone mixture, then 32 parts (0.5 mole) of glacial acetic acid are slowly added thereto over a period of 3 hours. The reaction mixture is then gradually warmed to room temperature and stirred for 12 hours. Next, the zinc acetate and unreacted couple is filtered from the reaction mixture, then the tetrahydrofuran is distilled therefrom at reduced pressure. The resulting crude oily product is washed with 300 parts of diethyl ether to give 14 parts (21% yield based on cinnamaldehyde) of solid distyryl ethylene glycol. Analysis of the product shows 81.44% carbon and 6.75% hydrogen as compared with theoretical values of 81.2% carbon and 6% hydrogen. The resulting product has a melting point of 158 to 159° C.

Example 5

About 68 parts of zinc-copper couple are charged to a reaction vessel together with 350 parts of tetrahydrofuran and 138 parts of isophorone. The reaction mixture is held at 0 to —5° C. in an acetone-Dry Ice bath and 64 parts of glacial acetic acid are added thereto over a 1½ hour period. The reaction mixture is then allowed to warm slowly and held at room temperature for 16 hours. Zinc-copper couple and zinc acetate are removed by filtration, then the tetrahydrofuran is distilled therefrom under reduced pressure. The product is purified by distilling low-boiling impurities under reduced pressure and recrystallization from absolute alcohol. The product, bis(1-hydroxy-3,5,5-trimethylcyclohex-2-ene)ethylene glycol, melts at from 165 to 167° C. and has a carbon-hydrogen analysis of 77.9% carbon and 10.78% hydrogen as compared with theoretical values of 77.6% and 10.8%, respectively.

Example 6

135 parts of zinc-copper couple and 700 parts of tetrahydrofuran are charged to the reaction vessel together with 140 parts of methyl vinyl ketone. The mixture is cooled 0 to —5° C., then 128 parts of glacial acetic acid are added thereto at that temperature over a period of about 2½ hours. Thereafter, the reaction mixture is gradually warmed and held at room temperature for 16 hours. Unreacted couple and zinc acetate are removed by filtration, then the tetrahydrofuran is distilled therefrom under reduced pressure. The product, 1,2-dimethyl-1,2-divinyl ethylene glycol, has a boiling point of 93 to 98° C. at a pressure of 15 millimeters of mercury absolute and a refractive index at 25° C. of 1.4740. Analysis shows 67.2% carbon and 9.87% hydrogen as compared with theoretical values of 67.6% and 9.87%, respectively.

Example 7

A zinc-copper couple is prepared from 400 parts of zinc and 40 parts of $CuSO_4 \cdot 5H_2O$ as described in the preceding examples. The zinc-copper couple together with about 2000 parts of methylal (dimethoxy methane) and 336 parts of acrolein are charged to a reaction vessel. Next, 384 parts of glacial acetic acid are added slowly to the reaction mixture held at a temperature of about —10 to 5° C. over a period of three hours. The reaction vessel is then allowed to warm to room temperature and stirred at that temperature overnight. Finally, the product is filtered then the methylal solvent stripped therefrom to yield 289 parts of divinyl ethylene glycol corresponding to a yield of 84.5% based on the weight of acrolein.

Example 8

A zinc-copper couple is prepared from 160 parts (2.45 moles) of zinc and 16 parts of $CuSO_4 \cdot 5H_2O$ as described in the preceding examples. The resulting couple is charged to the reaction vessel together with about 900 parts of dioxane and 135 parts (2.4 moles) of acrolein. The reaction vessel is cooled to 0 to 10° C. and 154 parts (2.56 moles) of glacial acetic acid is slowly added thereto over a period of about 2 hours. The reaction vessel is allowed to warm, then stirred at room temperature for about 16 hours. Finally, the product is filtered, then the dioxane solvent is stripped therefrom under reduced to give a 83.3% yield of divinyl ethylene glycol having a boiling point of 65° C. at a pressure of 0.22 millimeters of mercury absolute and refractive index at 26° C. of about 1.4755.

Example 9

A zinc-copper couple is prepared from 100 parts (1.67 moles) of zinc dust and 10 parts of $CuSO_4 \cdot 5H_2O$ as described in Example 1. The resulting couple is then charged to a reaction vessel along with about 84 parts of acrolein (1.5 mole) and 350 parts of dimethoxy ethane. The reaction mixture is cooled to —10° C. with a mixture of Dry Ice and acetone and then 94.2 parts of glacial acetic acid (1.57 moles) is slowly added thereto over a period of one hour. The resulting reaction mixture is stirred for 18 hours at room temperature and filtered. Finally, the dimethoxy ethane is distilled therefrom to give a product boiling at a pressure of 1.5 millimeters of mercury absolute at a temperature of 68 to 72° C. The yield is 85.6% based on acrolein. Infra-red analysis indicates that the reaction product is substantially pure divinyl ethylene glycol.

If the procedure described above is repeated using 72.5 parts of formic acid instead of acetic acid used above, substantially similar results are obtained.

Example 10

The procedure described in the preceding example is repeated except that diethoxy methane solvent is used. About 78 parts of divinyl ethylene glycol representing a 91% yield based on acrolein are obtained. Infra-red analysis indicates that the product is essentially pure. The refractive index of the product is 1.4749 at 25° C. The product boils at 56° C. at a pressure of 0.1 millimeter of mercury absolute.

Example 11

68 parts of zinc-copper couple and 350 parts of tetrahydrofuran are charged to a reaction vessel together with 56 parts of acrolein. The reaction mixture is cooled to about 0° C. in an acetone-Dry Ice bath and 56 parts of 98% sulfuric acid are added thereto dropwise over a period of about 3 hours. The reaction mixture is then allowed to rise slowly to room temperature, then is held at that temperature with agitation for about 16 hours. Unreacted couple and zinc sulfate are filtered from the resulting product and the filtrate neutralized with solid sodium bicarbonate. Tetrahydrofuran is then removed therefrom under reduced pressure and the resulting divinyl ethylene glycol fractionally distilled under reduced pressure. The product boils at 71 to 72° C. at a pressure about 1 millimeter of mercury absolute.

Example 12

A zinc-copper couple is prepared by the procedure described in the preceding examples from 500 parts (7.65 moles) of zinc dust and 50 parts of $CuSO_4 \cdot 5H_2O$. The zinc-copper couple together with 420 parts (7.5 moles) of acrolein and 3000 parts of tetrahydrofuran is charged to a reaction vessel. Next, 480 parts (8.0 moles) of glacial acetic acid is added to the reaction vessel for a period of about 15 minutes during which time the reaction temperature rapidly rises to about 70° C. The reaction mixture is then allowed to slowly cool to about room temperature over a period of about 4 hours. After the product is filtered and the tertahydrofuran solvent is stripped therefrom under reduced pressure, the resulting product is fractionally distilled under reduced pressure to yield 278 parts (65.3% yield based on acrolein) of divinyl ethylene glycol boiling at a temperature of 88° C. at a pressure of 6.5 millimeters of mercury absolute.

I claim:

In the process for reductively coupling acrolein to form divinyl ethylene glycol, the improvement of carrying out said coupling reaction under anhydrous conditions at about −20° C. to 30° C. with about 1 to 2 chemical equivalents of zinc-copper couple and one chemical equivalent of acrolein in an inert ether solvent having a boiling point at atmospheric pressure of about 40–100° C. and also in the presence of about 1–1.5 chemical equivalents of acetic acid.

References Cited by the Examiner
FOREIGN PATENTS 453,324  12/1948  Canada.
453,545  12/1948  Canada.

OTHER REFERENCES

Handbook of Chemistry and Physics, Chemical Rubber Publishing Co., 37th edition 1955–1956, pages 716, 717, 868 and 869.

Wiemann: Annales de Chemie, Series II, vol. 5, pages 287–290 (1936).

Young et al.: Jr. Am. Chem. Soc., vol. 58 (1936) page 2275.

LEON ZITVER, *Primary Examiner.*